United States Patent [19]

Weemes et al.

[11] 4,401,805

[45] Aug. 30, 1983

[54] MODIFIED POLY(ETHYLENE TEREPHTHALATE) HAVING IMPROVED GAS BARRIER PROPERTIES

[75] Inventors: Doyle A. Weemes, Greeneville; Robert W. Seymour; Thomas H. Wicker, both of Kingsport, all of Tenn.

[73] Assignee: Eastman Kodak Company, Rochester, N.Y.

[21] Appl. No.: 353,715

[22] Filed: Mar. 1, 1982

[51] Int. Cl.$^3$ .................................... C08G 63/16
[52] U.S. Cl. ............................... 528/302; 528/193; 528/194; 528/308
[58] Field of Search ................ 528/193, 194, 302, 308

[56] References Cited

U.S. PATENT DOCUMENTS

| | | | |
|---|---|---|---|
| 4,065,439 | 12/1977 | Uno et al. | 528/302 |
| 4,076,693 | 2/1978 | Go | 528/302 |
| 4,098,769 | 7/1978 | Go | 528/194 |
| 4,115,363 | 9/1978 | Go | 528/294 |
| 4,145,517 | 3/1979 | Go | 528/294 |
| 4,340,721 | 7/1982 | Bonnebat et al. | 528/302 |

*Primary Examiner*—Lucille M. Phynes
*Attorney, Agent, or Firm*—John F. Stevens; Daniel B. Reece, III

[57] ABSTRACT

Disclosed are compositions having improved resistance to oxygen and carbon dioxide permeability comprising a copolyester derived from an acid component consisting essentially of 55–99 mol % terephthalic acid, 45–1 mol % of at least one acid of the formula HOOC—(CH$_2$)$_n$—COOH where n is 1 to 6, and a glycol component, at least 60 mol % of which is ethylene glycol, the copolyester having an I.V. of about 0.1–1.5.

6 Claims, 3 Drawing Figures

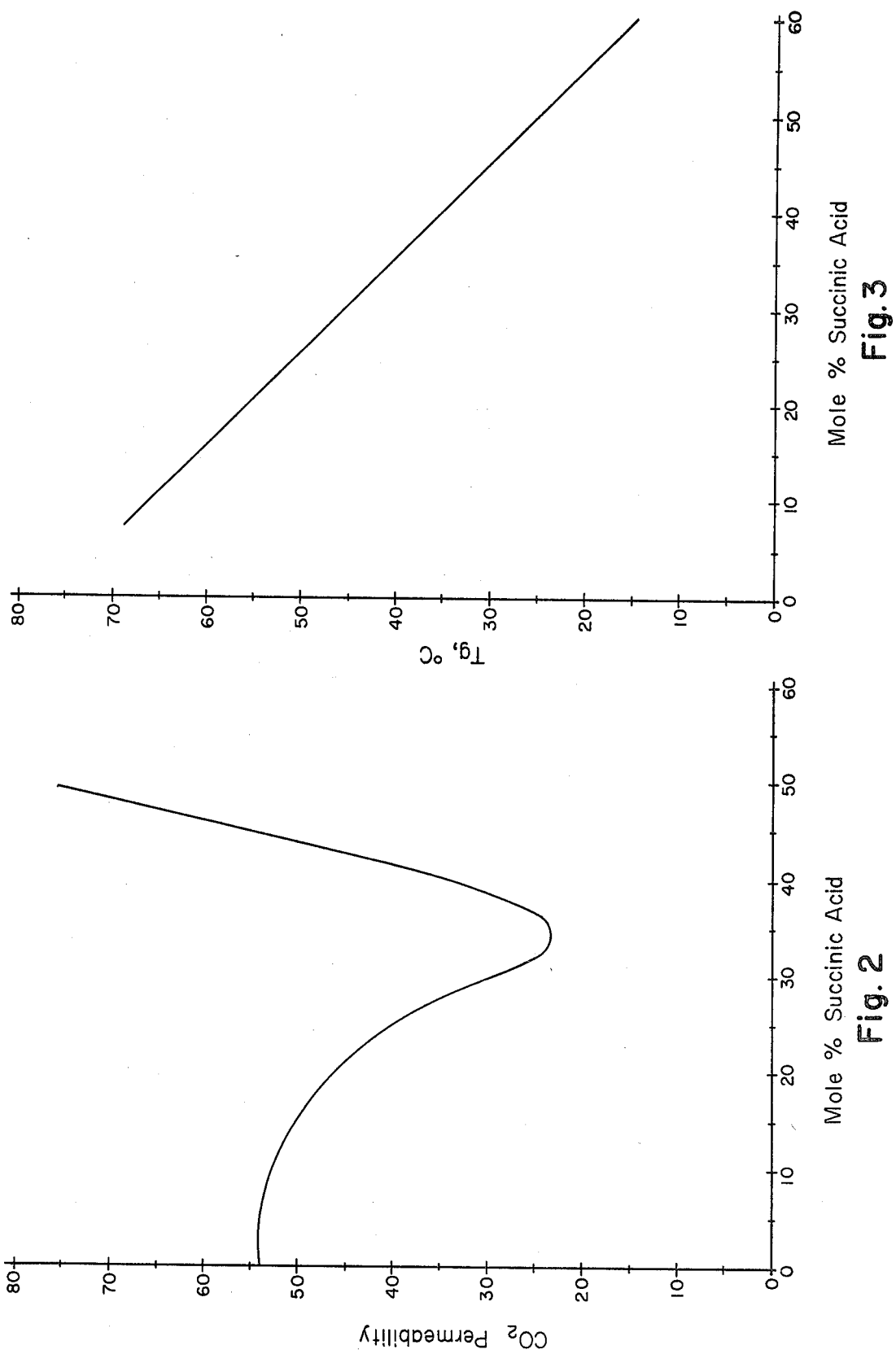

4,401,805

MODIFIED POLY(ETHYLENE TEREPHTHALATE) HAVING IMPROVED GAS BARRIER PROPERTIES

TECHNICAL FIELD

This invention relates to compositions of matter and articles produced from such compositions, the compositions comprising copolyesters which unexpectedly have improved gas barrier properties when in the form of articles such as film or sheet material. The compositions are especially useful in packaging applications where improved barrier properties are required.

BACKGROUND ART

Copolymers of poly(ethylene terephthalate) (referred to sometimes herein as PET) with various dicarboxylic acids are well known in the art. Examples are U.S. Pat. Nos. 3,625,409; 3,669,921; 3,733,309; 3,932,358; 3,948,859; and 3,966,836. With the exception of U.S. Pat. No. 3,733,309 most of these deal with low molecular weight and low-melting copolyesters. Other patents of interest are U.S. Pat. Nos. 4,115,363; 4,145,517; 4,076,693; 4,049,631; 4,098,769; and 4,100,303.

BRIEF DESCRIPTION OF DRAWINGS

FIG. 2 is a graphical representation of carbon dioxide permeability relative to mole % of succinic acid.

FIG. 3 is a graphical representation of glass transition temperature, Tg, relative to mole % of succinic acid.

DISCLOSURE OF INVENTION

Figure 1:
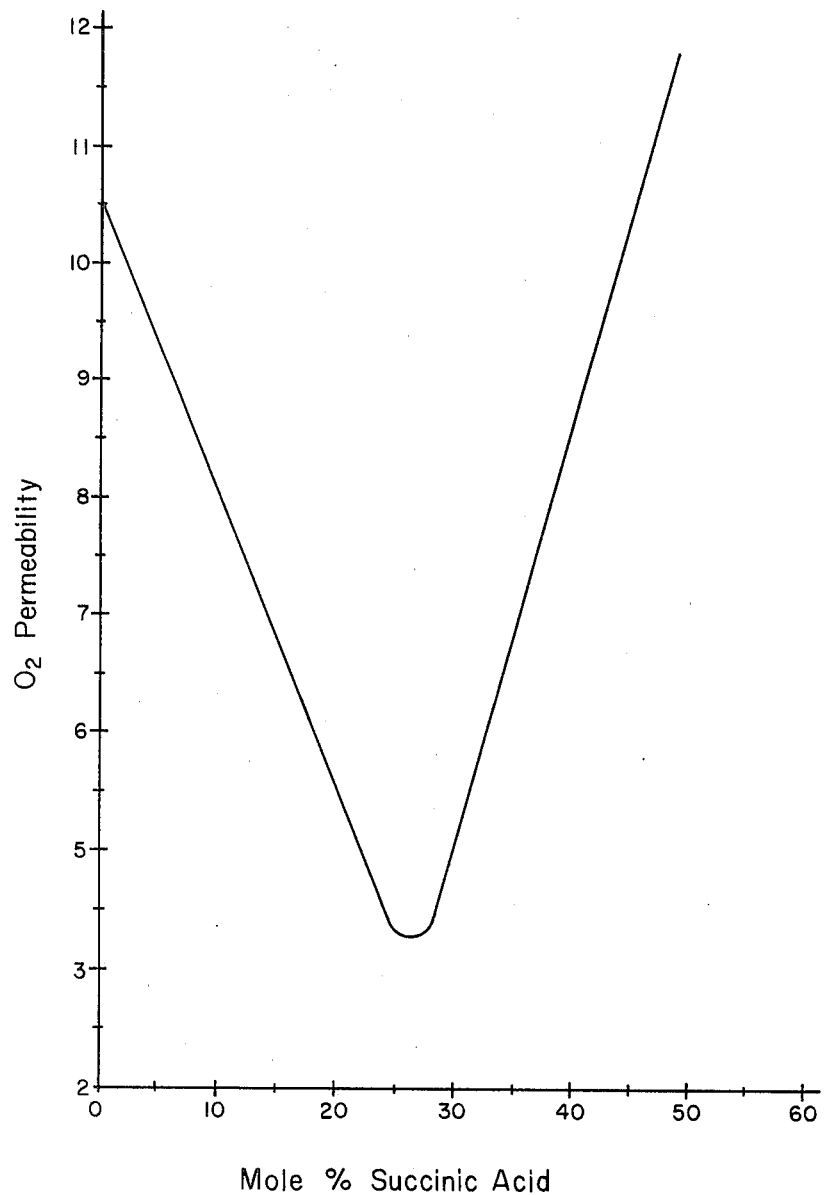
FIG. 1 is a graphical representation of oxygen permeability relative to mole % of succinic acid.

According to this invention, there are provided containers having improved resistance to oxygen and carbon dioxide permeability comprising a copolyester derived from an acid component consisting essentially of 55–99 mol % terephthalic acid, 45–1 mol % of at least one acid of the formula $HOOC-(CH_2)_n-COOH$ where n is 1 to 6, and a glycol component, at least 60 mol % of which is ethylene glycol, the copolyester having an I.V. of about 0.1–1.5.

The copolyesters are prepared by conventional, well known polycondensation procedures. The compositions are characterized by having an oxygen permeability less than that of poly(ethylene terephthalate), when measured through a one-mil film 100 square inches in area for 24 hours under an oxygen partial pressure difference of one atmosphere. The compositions are readily formed into film or sheet material especially useful as a packaging material.

In general, up to about 40 mol % of other aliphatic and aromatic diols can be used to prepare the polyesters as long as about 60 mol % in ethylene glycol. Examples of such diols include propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,4-butanediol; 1,5-pentanediol; 1,6-hexanediol; 2.2.4-trimethyl-1,6-hexanediol, 1,2-cyclohexanedimethanol; 1,3-cyclohexanedimethanol; 1,4-cyclohexanedimethanol; 2,2,4,4-tetramethyl-1,3-cyclobutanediol; o-, m-, and p-xylene diols; 4,4'-sulfonyldiphenol; 4,4'-oxydiphenol; 4,4'-isopropylidenediphenol; and 2,5'-naphthalenediol.

If desired, conventional additives such as dyes, pigments, stabilizers, plasticizers, fillers, etc., may be added to the compositions in the usual amounts.

Film or sheet material made from the compositions of the present invention is strong, flexible and clear. It may be formed into articles such as wrappers, bags, bottles, and the like. Such articles are found to have improved gas barrier properties as determined by oxygen permeability properties, and are especially useful in the packaging of food.

The following examples are submitted for a better understanding of the invention.

In the examples, oxygen permeability is determined in cubic centimeters permeating a 1 mil thick sample, 100 inches square, for a 24-hour period under an oxygen partial pressure difference of one atmosphere at 30° C. using a MOCON Oxtran 100 instrument. The film actually used to measure permeability is frequently 3–8 mils in thickness, but the permeability is readily converted to a one mil basis using conventional calculations. Carbon dioxide permeability is determined at 30° C. using a MOCON Permatran C.

The polyesters used in the following examples are prepared by normal polymerization procedures and extruded into 5 to 10 mil films using a Brabender extruder at 240°–260° C.

EXAMPLE 1

Copolyesters of PET modified with 11 to 16 mol % of the $HOOC-(CH_2)_n-COOH$ type surprisingly have reduced oxygen permeabilities when $n \leq 6$. The oxygen permeabilities are substantially increased relative to the PET control when n exceeds 6. The compositions with $n \leq 6$ also have unexpectedly reduced carbon dioxide permeabilities (Table 1). It is critical that n be no greater than 6 for the acid modified PET to have a combination of reduced oxygen and carbon dioxide permeability.

EXAMPLE 2

The oxygen and carbon dioxide permeabilities of the modified PET also depend on the modifier concentration. The effect of succinic acid modifier concentration on the oxygen and carbon dioxide permeabilities is shown in Table 2 and FIGS. 1 and 2. Surprisingly, when the succinic acid concentration is below about 45 mol %, the oxygen and carbon dioxide permeabilities are reduced relative to the PET control. The preferred composition region for maximum effect on the permeability is about 25 to 35 mol % modification.

As the concentration of the modifier is increased, the Tg of the copolymer decreases. In general, it will be desirable to limit the levels of modification to those which do not reduce the Tg below about 30° C. As can be seen from FIG. 3, this is about 45 mol % for the succinic acid modification.

The acid modified polyesters may be used as a laminating layer between two or more permeable layers of film. The modified polyesters may also be used for dip coating containers from a polymer solution to improve the barrier properties of a package.

Because of the decreased gas transmission rates of these copolyesters, they perform well in packaging applications where greater gas barrier properties are required, such as salad oils and dressings, as well as relish and other food items.

TABLE 1

Barrier Properties of Acid Modified Poly(ethylene terephthalate)

| Ex. | (HOOC—$(CH_2)_n$—COOH) Name | n | Mole % | Gas Permeability cc mil/100 sq. in./ 24 hrs. ATM Oxygen | Carbon Dioxide |
|---|---|---|---|---|---|
| 3 | PET Control | — | — | 10.5 | 54.0 |
| 4 | Succinic | 2 | 15.6 | 6.6 | 50.5 |
| 5 | Glutaric | 3 | 14.0 | 7.3 | 42.8 |
| 6 | Adipic | 4 | 13.0 | 7.4 | 40.7 |
| 7 | Suberic | 6 | 11.0 | 7.4 | 32.0 |
| 8 | Azelaic | 7 | 13.9 | 11.6 | 42.8 |
| 9 | Sebacic | 8 | 13.9 | 13.8 | 60.9 |
| 10 | Dodecanedioic | 10 | 8.6 | 13.0 | 61.0 |

TABLE 2

Barrier Properties of Succinic Acid Modified Poly(ethylene terephthalate)

| Ex. | Succinic Acid, Mole % | Gas Permeability cc mil/100 sq. in./24 hrs. ATM Oxygen | Carbon Dioxide |
|---|---|---|---|
| 11 | 0.0 | 10.5 | 54.0 |
| 12 | 1.6 | 8.2 | — |
| 13 | 7.97 | 7.6 | — |
| 14 | 15.62 | 6.6 | 50.5 |
| 15 | 30.08 | 4.9 | 26.8 |
| 16 | 39.60 | 8.5 | 33.8 |
| 17 | 48.70 | 11.7 | 76.4 |
| 18 | 58.50 | 18.6 | — |

All inherent viscosities are determined at 25° C. in a (60/40 by weight) mixture of phenol/tetrachloroethane at a concentration of 0.5 g/100 ml. The melting points and glass transition temperatures are determined with a Perkin-Elmer DSC-2 differential scanning calorimeter at a heating rate of 20° C./min.

Unless otherwise specified, all parts, ratios, percentages, etc., are by weight.

The invention has been described in detail with particular reference to preferred embodiments thereof, but it will be understood that variations and modifications can be effected within the spirit and scope of the invention.

We claim:

1. A container having improved resistance to oxygen and carbon dioxide permeability comprising a copolyester derived from an acid component consisting essentially of 55–99 mol % terephthalic acid, 45–1 mol % of at least one acid of the formula HOOC—$(CH_2)_n$—COOH where n is 1 to 6, and a glycol component, at least 60 mol % of which is ethylene glycol, said copolyester having an I.V. of about 0.1–1.5.

2. A container according to claim 1 wherein said acid component consists essentially of about 65–75 mol % terephthalic acid and about 35–25 mol % of at least one acid of the formula HOOC—$(CH_2)_n$—COOH where n is 1 to 6.

3. A container according to claim 1 wherein said acid having the formula HOOC—$(CH_2)_n$—COOH is selected from the group consisting of succinic, glutaric, adipic and suberic.

4. A container according to claim 1 characterized in having an oxygen permeability of less than 8, measured as cubic centimeters permeating a 1 mil thick sample, 100 inches square, for a 24 hour period under an oxygen partial pressure difference of 1 atmosphere at 30° C.

5. A container according to claim 2 characterized in having an oxygen permeability of less than 8, measured as cubic centimeters permeating a 1 mil thick sample, 100 inches square, for a 24 hour period under an oxygen partial pressure difference of 1 atmosphere at 30° C.

6. A container according to claim 3 characterized in having an oxygen permeability of less than 8, measured as cubic centimeters permeating a 1 mil thick sample, 100 inches square, for a 24 hour period under an oxygen partial pressure difference of 1 atmosphere at 30° C.

* * * * *